United States Patent [19]
Sakamoto et al.

[11] 4,172,265
[45] Oct. 23, 1979

[54] AUTOMATIC HEAD TRACKING SYSTEM

[75] Inventors: Hitoshi Sakamoto, Zama; Takeo Ohba, Tokyo; Yoshiaki Wakisaka, Atsugi, all of Japan

[73] Assignee: Sony Corporation, Tokyo, Japan

[21] Appl. No.: 912,028

[22] Filed: Jun. 2, 1978

[30] Foreign Application Priority Data

Dec. 29, 1977 [JP] Japan .................. 52-158188

[51] Int. Cl.$^2$ .................. G11B 5/52; G11B 21/10; G11B 21/18
[52] U.S. Cl. .................. 360/70; 360/77; 360/107; 360/109
[58] Field of Search .................. 360/70, 77, 76, 107, 360/75, 108, 109, 113; 310/332

[56] References Cited

U.S. PATENT DOCUMENTS

| | | | |
|---|---|---|---|
| 3,375,331 | 3/1968 | Okazaki et al. | 360/107 |
| 4,099,211 | 7/1978 | Hathaway | 360/77 |
| 4,106,065 | 8/1978 | Ravizza | 360/107 |

Primary Examiner—Alfred H. Eddleman
Attorney, Agent, or Firm—Lewis H. Eslinger; Alvin Sinderbrand

[57] ABSTRACT

In an apparatus for reproducing video or other information signals recorded in a track on a magnetic tape or other record medium; a magnetic head or transducer is moved along the track for reproducing the information signals recorded therein while a bi-morph leaf which supports the head receives an electrical drive signal for deflecting the head in a direction transverse to that along the track. A deflection signal is generated in correspondence to the deflection of the head from a rest position by a circuit which includes a strain gauge fixed on the bi-morph leaf. A control circuit for controlling the deflection of the head includes an oscillator providing a dither oscillation signal which, on application to the bi-morph leaf, causes transverse oscillation of the head about a null position, an envelope detector detecting the envelope of the reproduced output of the head, a multiplier for synchronously demodulating the detected envelope by means of the deflection signal so as to obtain a tracking error signal accurately representative of the deviation of the null position of the head from the center of the track, and an adder adding the tracking error signal to the dither oscillation signal so as to provide therefrom the electrical drive signal and by which the null position of the oscillated head is aligned with the center of the track.

11 Claims, 10 Drawing Figures

AUTOMATIC HEAD TRACKING SYSTEM

BACKGROUND OF THE INVENTION

1. Field of the Invention

This invention relates generally to apparatus for reproducing video or other information signals recorded in a track on a record medium, for example, as in a video tape recorder in which the video signals are recorded in successive parallel tracks which are skewed or extend obliquely on a magnetic tape. More particularly, the invention is directed to an improved system or arrangement by which a magnetic head or other transducer is made to accurately track or scan the track or tracks in which the video or other information signals are recorded.

2. Description of the Prior Art

It is conventional to record video or other information signals along successive parallel tracks which are skewed or extend obliquely on a magnetic tape, for example, as in a helical scan VTR. It has been proposed, for example, as disclosed in Belgian Patent Application No. 852,715, which has been laid opened to public inspection and corresponds to U.S. patent application Ser. No. 669,047, filed Mar. 22, 1976, to provide a system by which an information or data signal transducer, for example, in the form of a rotary magnetic head, is continuously maintained in a desired position in respect to the recorded information signal track or tracks on a magnetic tape in a helical scan VTR. In such previously proposed system, the position of the information signal transducer or head relative to the track is monitored during the scanning of the track through the reproduction of the recorded information signals while a small oscillatory motion or dither is imparted to the transducer or head via its supporting element or arm which is, for example, in the form of a piezo-electric bender element or bi-morph leaf. The oscillatory motion or dither is induced in the supporting element or arm by applying to the latter a suitable drive signal which causes the transducer or fluctuate or oscillate transversely about its normal scanning path. The oscillation of the transducer introduces deviations in the envelope of the reproduced information signals resulting from the scanning of the record track. Such deviations take the form of an amplitude modulation of the envelope of the reproduced signals, with the change in magnitude of the envelope being representative of the amount of transverse displacement of the transducer from the optimum transducing or centered position with respect to the track, and with the direction of transverse displacement of the transducer from the optimum transducing position being represented by the phase of the envelope amplitude modulation at the fundamental frequency of the oscillatory motion or dither. To obtain such transducer or head position information, the modulated RF envelope signal reproduced by the transducer is applied to an amplitude modulation envelope detector which recovers the dither signal fundamental and its sidebands, whereupon the output of the envelope detector is applied to a synchronous amplitude modulation detector which detects the amplitude and polarity of the output of the envelope detector with reference to the original or constant dither or oscillation signal by which the head is simultaneously made to oscillate transversely. The synchronous amplitude modulation detector provides a tracking error signal which is added to the dither or oscillation signal to provide the drive signal for effecting oscillation of the head or transducer. Generally, the amplitude of the tracking error signal is proportional to the transverse distance from the null position of the oscillated head to the track center, while the polarity of the tracking error signal is indicative of the direction of such displacement of the null position from the track center. Therefore, the tracking error signal, when added to the dither or oscillation signal, tends to align the null position of the transducer with the center of the track.

It will be apparent that, in the above-proposed automatic head tracking system, the output of the envelope detector contains various unwanted frequency components due to mechanical vibration of the bi-morph leaf supporting the head and such unwanted frequency components adversely affect the accuracy of the tracking error signal obtained when the output of the envelope detector is compared with the constant dither or oscillation signal in the synchronous amplitude modulation detector.

The existence of problems due to mechanical vibration of the bi-morph leaf supporting the reproducing head or transducer has been recognized, for example, in U.S. Pat. No. 4,080,636. In the system disclosed in such patent, the output of the reproducing head or transducer is processed in the manner described above, that is, such output is envelope-detected and then compared with the constant dither or oscillation signal which is applied to the bi-morph leaf so as to obtain the tracking error signal which is ultimately added to the dither or oscillation signal for providing the drive signal of the bi-morph leaf. In addition to the foregoing, the above-identified patent discloses a negative feedback loop for developing an electrical damping signal which is also applied to the bi-morph leaf so as to dampen its vibrations or oscillations, particularly at the resonance frequency thereof. In the system being described, the electrical damping signal is derived from a signal generator or sensor which is integral with the bi-morph leaf for generating a signal which is representative of the instantaneous deflected position of the transducer or head, and which is converted to a transducer velocity signal by means of a differentiator. The transducer velocity signal is then passed through a low pass filter which attenuates the signals attributable to second and higher order resonance characteristics of the bi-morph leaf, and which is followed by a phase lead network operative to shift the phase of signals received from the filter so that those signals having a frequency near the resonance frequency of the bi-morph leaf will have a net phase shift of 0°. Finally, the output of the phase lead network is applied to an inverting or negative feedback amplifier so as to obtain the damping signal which is added to the previously-described drive signal. Thus, the signal representative of the instantaneous deflected position of the head or transducer as obtained from the signal generator or sensor integral with the bi-morph leaf is only employed for producing the feedback or electrical damping signal by which mechanical vibration of the bi-morph leaf at its resonance frequency is damped. However, such damping action does not eliminate or correct inaccuracies appearing in the tracking error signal by reason of the fact that the latter is still derived from a comparison of the fixed dither oscillation signal with the envelope detected output of the reproducing head or transducer which contains mechanically induced vibrations or other undesired frequency components.

OBJECTS AND SUMMARY OF THE INVENTION

Accordingly, it is an object of this invention to provide an automatic head tracking system which affords a greater degree of accuracy in tracking than has been heretofore attainable.

Another object is to provide an automatic head tracking system, as aforesaid, which achieves accurate tracking by means of a relatively simple and easily produced arrangement.

In accordance with an aspect of this invention, in an apparatus for reproducing information signals recorded in a track on a record medium by means of a reproducing transducer movable along such track; automatic tracking or scanning is achieved by providing transducer deflecting means mounting the reproducing transducer and being operative in response to the reception of an electrical drive signal for deflecting the transducer in a direction which is transverse in respect to the direction along the track, deflection signal generating means including a strain gauge fixed to the means mounting the transducer for generating a deflection signal in correspondence to the deflection of the transducer in the transverse direction from a rest position thereof, and control circuit means including an oscillator for providing the dither oscillation signal which, on application to the transducer deflection means, causes the transducer to oscillate in the transverse direction about a null position, envelope detecting means for detecting the envelope of the output of the transducer as the latter moves along the track and oscillates in the transverse direction, means for synchronously demodulating the detected envelope by means of the deflection signal so as to obtain a tracking error signal accurately representative of the deviation of the null position of the transducer from the center of the track considered in the transverse direction, and means for adding the tracking error signal to the dither oscillation signal so as to provide therefrom the electrical drive signal for the transducer deflecting means and by which the null position of the transducer is aligned with the center of the track.

It will be noted that, in accordance with the above-described aspect of the invention, the tracking error signal is derived by a comparison of the envelope detected output of the reproducing transducer which includes frequency components resulting from mechanical vibration of the bi-morph leaf or other support for the transducer, with the deflection signal which similarly includes such frequency components due to mechanical vibration of the bi-morph leaf, so that the unwanted frequency components due to mechanical vibration or the like are automatically eliminated from the tracking error signal by cancelling each other.

The above, and other objects, features and advantages of the invention, will be apparent in the following detailed description of an illustrative embodiment of the invention which is to be read in connection with the accompanying drawings.

DESCRIPTION OF A PREFERRED EMBODIMENT

Figure 1:
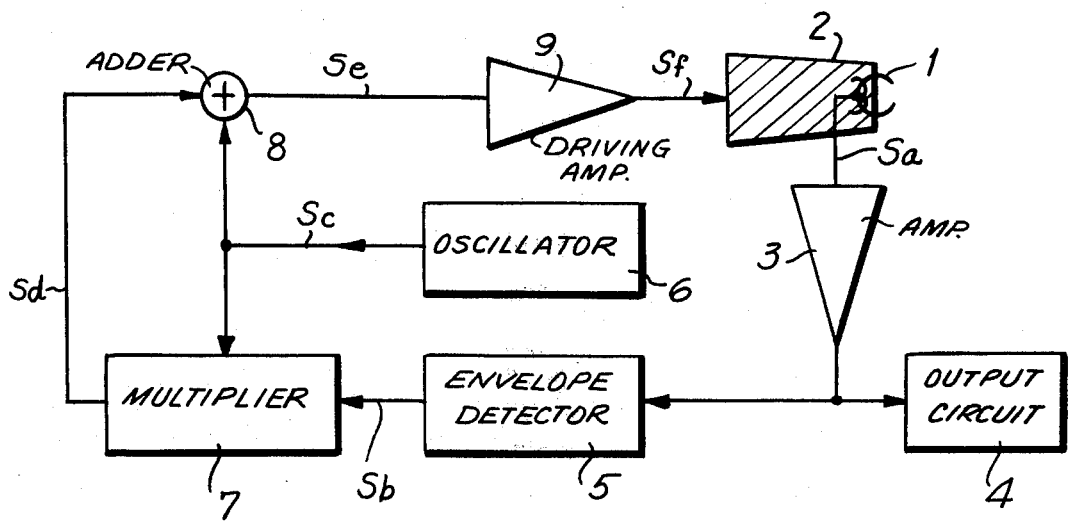
FIG. 1 is a schematic block diagram illustrating an automatic head tracking system according to the prior art.
Figure 2:
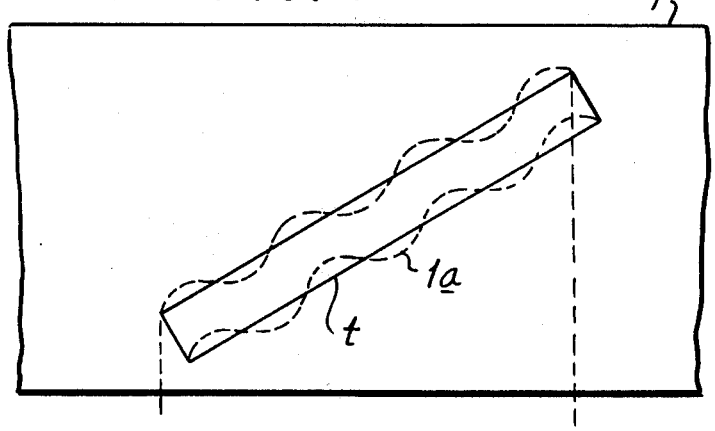
FIG. 2 is a schematic view illustrating a section of a magnetic tape with a record track extending obliquely thereon, and with the path of a reproducing head or transducer being represented in broken lines.

Referring to the drawings in detail, and initially to FIG. 1 thereof, it will be seen that, in an existing automatic head tracking system of the type disclosed in the previously mentioned laid-open Belgian Pat. Appln. No. 77.03797, each rotary magnetic head 1 of a helical scan VTR is mounted on a rotary portion of the usual guide drum (not shown) by way of a bi-morph leaf 2 which can flex in the axial direction of the guide drum. As is conventional, the video or other information signals are recorded in successive parallel tracks which are skewed or extend obliquely on a magnetic tape T, for example, as is indicated in respect to the single record track t on FIG. 2. Therefore, when the recorded magnetic tape T is guided in a helical path about a substantial portion of the periphery of the guide drum, the rotary magnetic head 1 may scan more or less along the record track t.

Figure 3:
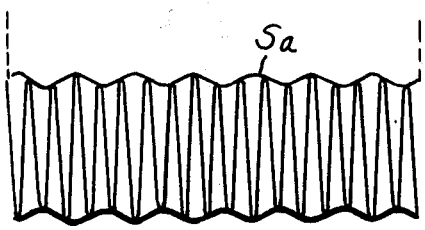
FIG. 3 is a graphic representation of the output signal from a reproducing head or transducer when scanning the record track in the manner shown on FIG. 2.

In the existing head tracking system of FIG. 1 for continuously maintaining the rotary head 1 in a desired position in respect to the record track t, the position of head 1 is monitored during the scanning of the track through evaluation of the reproduced signals $S_a$ from head 1 while a small oscillatory motion or dither is imparted to head 1 by applying a suitable drive signal $S_f$ to the bi-morph leaf 2. The resulting oscillation of the head 1 in the direction transverse to the direction along the track t, as indicated in broken lines at 1a on FIG. 2, introduces deviations in the envelope of the reproduced video or other information signal $S_a$ (FIG. 3) resulting from the scanning of record track by head 1. Such deviations take the form of amplitude modulation of the envelope of the reproduced signals $S_a$, with the change in magnitude of the envelope being representative of the amount of transverse displacement of the head 1 from the optimum transducing or centered position with respect to the track t, and with the direction of the transverse displacement of the head from the optimum transducing position being represented by the phase of the envelope amplitude modulation at the fundamental frequency of the oscillatory motion or dither.

In order to obtain the above-described head position information, the existing head tracking system shown on FIG. 1 applies the reproduced signals $S_a$ from head 1 through a reproducing amplifier 3 to an output circuit 4 which processes the reproduced video signal and to an amplitude modulation envelope detector 5 which recovers the dither signal fundamental and its sidebands. Thereupon, the output $S_b$ of envelope detector 5 is applied to a synchronous amplitude modulation detector 7 which detects the amplitude and polarity of the output $S_b$ of the envelope detector with reference to the original or constant dither or oscillation signal $S_c$ by which the head 1 is made to oscillate transversely. The synchronous amplitude modulation detector 7 provides a tracking error signal $S_d$ which is applied to an adding circuit 8 for addition therein to the dither or oscillation signal $S_c$ having a frequency $f_c$ of about 450 Hz. The resulting added signal $S_e$ is acted upon by a driving amplifier 9 to provide the driving signal $S_f$ for the bi-morph leaf 2.

Generally, the amplitude of the tracking error signal $S_d$ is proportional to the transverse distance from the null position of the oscillated head 1 to the center of the scanned track t, while the polarity of tracking error signal $S_d$ is indicative of the direction of such displacement of the null position from the track center. Therefore, the tracking error signal $S_d$, when added to the dither or oscillation signal $S_c$, tends to align the null position of the oscillated head 1 with the center of the track t. However, it will be apparent that, in the system illustrated on FIG. 1, any mechanical vibration of the bi-morph leaf 2 supporting head 1 will cause the output of envelope detector 5 to contain various unwanted frequency components. When such output $S_b$ of the envelope detector 5 is compared, in synchronous amplitude modulation detector 7, with the constant dither or oscillation signal $S_c$ from fixed oscillator 6 which, of course, does not include the unwanted frequency components due to mechanical vibration, the tracking error signal $S_d$ obtained from the modulation detector 7 is influenced by the unwanted frequency components and the accuracy of tracking is adversely affected.

Figure 4:
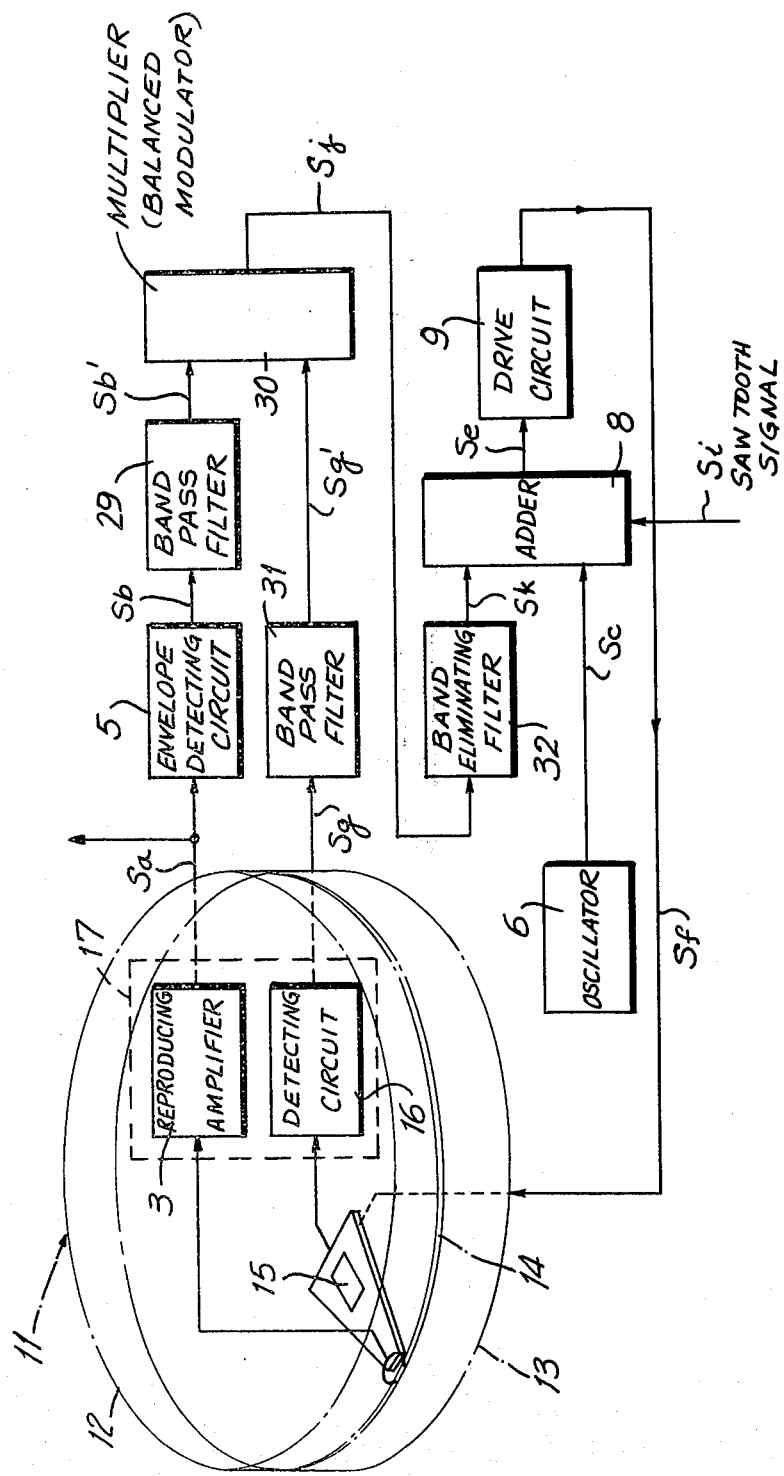
FIG. 4 is a diagrammatic view illustrating an automatic head tracking system according to an embodiment of this invention.

Referring now to FIG. 4, in which parts corresponding to those previously described with reference to FIG. 1 are identified by the same reference numerals, it will be seen that, in an automatic head tracking system 10 according to this invention, the guide drum associated with the rotary head or transducer 1 is shown in broken lines and generally identified by the reference numeral 11. Such guide drum assembly 11 includes a rotatable upper drum portion 12 and a stationary lower drum portion 13 with a radially opening circumferential slit 14 being defined between drum portions 12 and 13. The bi-morph leaf 2 of piezo-ceramic material is fixed at its base or inner end to the bottom surface of the rotatable upper drum portion 12 so that the magnetic head 1 in the bi-morph leaf 2 extends through slit 14 and is movable vertically or in the direction parallel to the axis of rotation of upper drum portion 26 in response to the deflection of bi-morph leaf 2 by the application of a drive signal $S_f$ thereto. Once again, a magnetic tape (not shown) is wrapped helically, that is, at an angle to the plane of slit 14, about a substantial portion, for example, about one half, of the periphery of drum 11 so that, upon rotation of head 1 with upper drum portion 12, head 1 scans obliquely across the magnetic tape and is simultaneously moved or oscillated in the direction normal to the scanning direction in response to the deflection of bi-morph leaf 2.

In the automatic head tracking system 10 according to this invention, a strain gauge 15 is secured to the surface of bi-morph leaf 2 to be stressed variably in response to the deflection of the latter and to cooperate with an associated circuit 16 for generating a deflection signal $S_g$ which instantaneously and accurately indicates the extent and direction of deflection of head 1 from its rest position. In the system 10 as shown on FIG. 4, the deflection signal generating circuit 16 and the reproducing amplifier 3 for amplifying the output of head 1 are included in a circuit assembly 17 which is suitably arranged within the rotary upper drum portion 12 of the guide drum.

Figure 5:
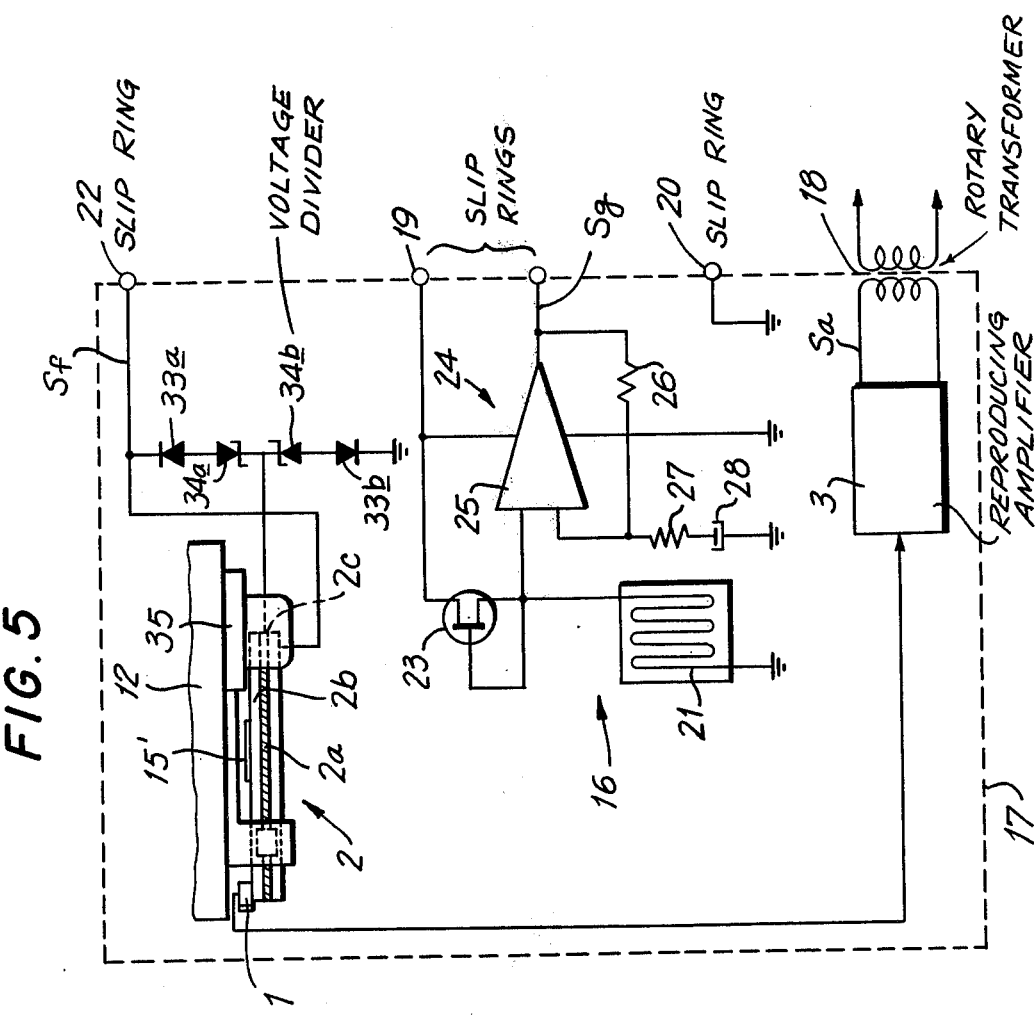
FIG. 5 is a circuit diagram showing details of a portion of the system illustrated on FIG. 4.

Referring now to FIG. 5, it will be seen that the reproduced signal from magnetic head 1 is amplified by reproducing amplifier 3 and is then transmitted from circuit assembly 17 in the upper drum portion 12 by way of a rotary transformer 18. Further, circuit assembly 17 is shown on FIG. 5 to be provided with slip rings schematically indicated at 19 and 20 and respectively adapted to be engaged by brushes or the like connected to a source of operating voltage and to ground, respectively. Additional slip rings indicated at 21 and 22 are provided for engagement by brushes which respectively deliver and receive the deflection signal $S_g$ and the drive signal $S_f$.

The strain gauge, which may be of the type employing a resistance wire, is illustrated at 15 on FIG. 5 in the position of its connection to circuit 11 and is also illustrated at 15' on FIG. 5 in the position of its physical attachment to bi-morph leaf 2.

The strain gauge 15 employing a resistance wire exhibits a change in its resistance value in response to deflection or flexing of the bi-morph leaf 2 on which the strain gauge is secured. The circuit 16 associated with strain gauge 15 is shown to include a field effect transistor 23 connected between slip ring 19 and strain gauge 15 so as to act as a constant current source for the latter. The change of resistance of the strain gauge 15 which occurs in response to deflection of bi-morph leaf 2 is converted to a corresponding change in the voltage which constitutes the deflection signal $S_g$ after being suitably amplified by an amplifier 24. The amplifier 24 is shown to include an operational amplifier 25, resistors 26 and 27 and a capacitor 28, and has its output connected to slip ring 21.

Figure 6A:
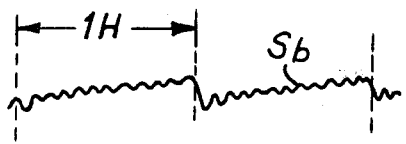
FIGS. 6A to 6E are waveforms to which reference will be made in explaining the operation of the system on FIG. 4.

As in the known head tracking system described above with reference to FIG. 1, in the system 10 according to the present invention, the reproduced frequency modulated signal or output $S_a$ of head 1 is applied through reproducing amplifier 3 and rotary transformer 18 to an output circuit (not shown) and to an envelope detecting circuit 5 (FIG. 4). Once again, the signal $S_a$ is amplitude-modulated with a dither or oscillation signal $S_c$ of the fixed frequency $f_c$ produced by an oscillator 6 and which may be about 450 Hz. The amplitude variations of the output or envelope signal $S_b$ (FIG. 6A) represent, among other things, tracking errors which exist between the path of movement of head 1 and the record tracks t being scanned by the head. However, the envelope signal $S_b$ also includes unwanted frequency components besides the tracking error information at the dither or oscillation signal frequencies $f_c$, such as, for example, frequency components at the primary and secondary resonant frequencies and at the anti-resonant frequency of bi-morph leaf 2 and various other frequency components due to transient responses.

Such unwanted frequency components adversely affect detection of, and correction for the tracking error between the scanning path of head 1 and the record track t on the magnetic tape.

The envelope signal $S_b$ from envelope detector 5 is applied to a band pass filter 29 which is adapted to pass a frequency band centered at the dither or oscillation frequency $f_c$ and which contains the tracking error information. More particularly, the upper cut-off frequency of band pass filter 29 is selected to be somewhat lower than the frequency $2f_c$, while the frequency $f_c$ is several times greater than the selected lower cut-off frequency of filter 29. The resulting output signal $S_b'$ from band pass filter 29 is applied to one input of a multiplier 30 which may be constituted by a balanced modulator and which has another input receiving the output $S_g'$ of a band pass filter 31 which receives the deflection signal $S_g$ from circuit 16.

Figure 6B:
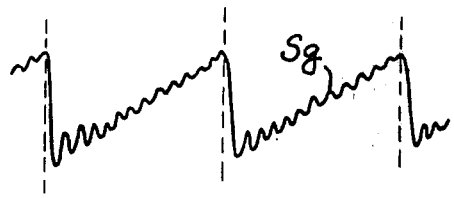

Band pass filter 31 has substantially the same characteristic as is described above for band pass filter 29, that is, filter 31 is adapted to pass a band of frequencies centered at the dither or oscillating signal frequency $f_c$. The deflection signal $S_g$ (FIG. 6B) from amplifier 16 which corresponds to the instantaneous deflection of head 1 from a rest position may have the frequency component $f_c$ corresponding to the oscillation of the bi-morph leaf 2 superimposed on a signal $S_i$ of triangular waveform which, as hereinafter described, may be additionally applied to the bi-morph leaf 2 during slow or still motion reproduction of the recorded video signals. In the absence of such signal $S_i$, the scanning path of head 1 would be at an angle in respect to the direction of each record track t being scanned by the head.

Figure 6C:
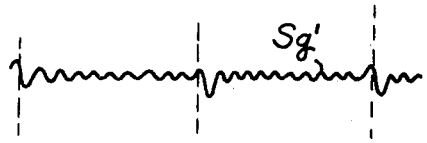

In any event, filter 31 is effective to remove from the deflection indicating signal $S_g'$ (FIG. 6C) obtained at its output the low-frequency component of any such triangular waveform $S_i$. However, signal $S_g'$ still contains the unwanted frequency components, such as, components at the first and second order resonant and antiresonant frequencies of bi-morph leaf 2 and various other frequency components due to the transient response in addition to the component at the dither or oscillation frequency $f_c$. Since the deflection signal $S_g$ or $S_g'$ represents the deflection of head 1 from its rest position, rather than the position of the head 1 relative to the center of the track t being scanned, it will be apparent that the deflection signal $S_g'$ applied to multiplier or balanced modulator 30 does not include any information in regard to the tracking error. It will be appreciated that the frequency, pahse and amplitude of the unwanted frequency components contained in deflection signal $S_g'$ substantially correspond to the frequency, phase and amplitude, respectively, of the corresponding unwanted frequency components contained in the envelope signal $S_b'$ obtained from filter 29.

Figure 6D:
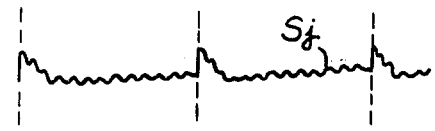
Figure 6E:
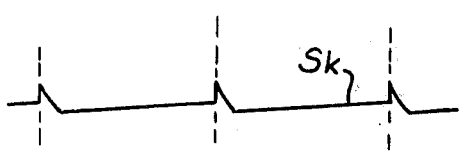

By reason of the above, the multiplier 30 which, as previously mentioned, may be a balanced modulator, provides an output signal $S_j$ (FIG. 6D) which represents the difference, or sum of the frequencies of the signals applied to the two inputs of multiplier 30. Thus, multiplier 30 is effective to eliminate from its output $S_j$ the components with the dither or oscillation frequency $f_c$ and with the unwanted frequencies, such as, the first and second order resonant and anti-resonant frequencies of the bi-morph leaf 2. The resulting output signal $S_j$ contains the information in respect to the tracking errors and also a frequency component having the frequency $2f_c$ generated by the multiplier 30 and which may be eliminated in a band eliminating filter 32. The filter 32 may be effective to block the passage therethrough of frequency components in a band centered at the frequency $2f_c$ and extending above and below the latter frequency by only a fraction of the frequencies $f_c$. As a result of the foregoing, a tracking error signal $S_k$ (FIG. 6E) representing the deviation of head 1 from the record track t being scanned thereby is obtained from band eliminating filter 32. Alternatively, the band eliminating filter 32 may be replaced by a low pass filter having a suitable characteristic to block the $2f_c$ frequency component.

The tracking error signal $S_k$ is applied to an adding circuit 8 in which it is added to the dither or oscillation signal $S_c$ from oscillator 6. Further, the adding circuit may receive the signal $S_i$ of triangular waveform which is applied to the slow or still motion reproducing mode of the VTR to compensate for the angular deviation of the path of rotary head 1 relative to the longitudinal direction of each record track t resulting from the fact that the speed of longitudinal advancement of the tape T in the slow or still motion reproducing mode is different from the normal speed of advancement of the tape during recording of each record track t. Finally, the output of adding circuit 8 is applied to a drive amplifier 9 to provide the drive signal $S_f$ by which bi-morph leaf 2 is driven so that the null position of head 1, when oscillated in the direction transverse to the direction along a record track, will correspond to the center of the track considered in such transverse direction.

As shown particularly on FIG. 5, the bi-morph leaf 2 supporting head 1 is preferably formed of lower and upper piezo-ceramic elements 2a and 2b, respectively, having outer electrodes, and a central electrode 2c interposed between elements 2a and 2b. Further, as shown the driving signal $S_f$ is supplied through slip ring 22 directly to the outer electrode of lower piezo-ceramic element 2a, and is further supplied, through a voltage divider consisting of diodes 33a and 33b and Zener diodes 34a and 34b to the central electrode 2c of bi-morph leaf 2. The outer electrode of upper piezo-ceramic element 2b of bi-morph leaf 2 is connected to ground, for example, through a supporting member 35 by which the inner end of bi-morph leaf 2 is secured to upper drum portion 12. It is also to be noted that the magnetic head 1 and the strain gauge, as indicated at 15' on FIG. 5, are secured on the grounded outer electrode of the upper element 2b of bi-morph leaf 2. Accordingly, the deflection signal $S_g$ which corresponds to the deflection of head 1 from its rest position is not superimposed on the drive signal $S_f$ for the bi-morph leaf 2.

Further, with the illustrated circuit for applying driving signal $S_f$ to bi-morph leaf 2, the piezo-ceramic elements 2a and 2b are poled or polarized in opposed directions, for example, toward each other, and the circuit comprised of diodes 33a and 33b and Zener diodes 34a and 34b ensures that the driving signal $S_f$ will not cause depolarizing of elements 2a and 2b. More particularly, if the voltage of the driving signal $S_f$ is $\pm E$, a voltage of $\pm \frac{1}{2}E$ is applied to each of elements 2a and 2b. If such voltage $\pm \frac{1}{2}E$ is lower than the Zener voltage Vz, each of the Zener diodes 34a and 34b is turned OFF and the bi-morph leaf is driven in correspondence to the voltage $\pm E$. If the driving voltage $\pm E$ is higher than $\pm 2$ Vz, that is, $\pm \frac{1}{2}E > Vz$, one or the other of the Zener diodes 34a and 34b is turned ON and has its voltage clamped at $\pm Vz$. When the driving voltage is $+E > +2$ Vz, the diode 33a is reversely biased to turn OFF Zener diode 34a, while diode 33b is forwardly biased to turn ON Zener diode 34b. Thus, the voltage at the junction point between Zener diodes 34a and 34b is clamped at $+Vz$. By reason of the foregoing, the voltage applied to element 2b is opposite to its poling direction but is clamped or maintained at the constant value Vz, while the voltage of $E-Vz$ is applied to element 2a to deflect bi-morph leaf 2 in the downward direction. Conversely, when the driving voltage is $-E > -2$ Vz, diode 33b is reversely biased to turn OFF Zener diode 34b, while diode 33a is forwardly biased to turn ON Zener diode 34a. Therefore, the clamped voltage Vz is applied to element 2a in opposition to the poling direction of the latter, and the voltage E − Vz is applied to element 2b to deflect the bi-morph leaf 2 in the upward direction. If the Zener voltage Vz is selected to be between $\frac{1}{2}$E max and $\frac{1}{3}$E max, in which E max is the upper limit of the driving voltage which, if applied to either of the piezo-ceramic elements 2a and 2b in the poling direction thereof, would effect deflection thereof with a linear relation between the driving voltage and deflection, then depolarization of the elements 2a and 2b of bi-morph leaf 2 is avoided.

It will be appreciated that, in the system according to this invention, the multiplier or balanced modulator 30 compares or synchronously demodulates the envelope signal $S_b'$ from envelope detector 5 by means of the detection signal $S_g'$ which represents the instantaneous position of the head 1 and thus includes all of the unwanted frequency components also contained in the envelope signal. The foregoing is to be distinguished from the known system of FIG. 1, in which the multiplier or balanced modulator 7 compares the envelope signal $S_b$ with the fixed dither or oscillating signal $S_c$ which does not include the unwanted frequency components arising from mechanical vibration or the like of the bi-morph leaf 2. By reason of such distinction, the multiplier or balanced modulator 30 of the system according to this invention automatically eliminates the unwanted frequency components from the output signal $S_j$, with the result that the signal $S_k$ accurately represents the tracking error so as to permit the head 1 to be automatically maintained precisely at the optimum tracking position by means of a relatively simple system.

Although the movable support 2 for the head 1 has been specifically described as being constituted by a bi-morph leaf, it will be understood that the support 2 may be constituted by any other type of piezo-electric element, or by a magneto-strictive or moving coil element.

Having described a specific embodiment of the invention with reference to the accompanying drawings, it is to be appreciated that the invention is not limited to that precise embodiment, and that various changes and modifications may be affected therein by one skilled in the art without departing from the scope or spirit of the invention as defined in the appended claims.

What is claimed is:

1. An apparatus for reproducing information signals recorded in a track on a record medium: comprising a transducer movable along said track for reproducing the information signal recorded therein; transducer deflecting means mounting said transducer and being operative in response to the reception of an electrical drive signal for deflecting said transducer in a direction which is transverse in respect to the direction along said track; deflection signal generating means including a strain gauge secured on said transducer deflecting means and circuit means for generating a deflection signal in response to stressing of said strain gauge in correspondence to the deflection of said transducer in said transverse direction from a rest position; and control circuit means including oscillating means for providing a dither oscillation signal which, on application to said transducer deflection means, causes said transducer to oscillate in said transverse direction about a null position, envelope detecting means for detecting the envelope of the output of said transducer as the latter moves along the track and oscillates in said transverse direction, means for synchronously demodulating the detected envelope from said envelope detecting means by means of said deflection signal so as to obtain a tracking error signal representative of the deviation of said null position of the transducer from the center of the track considered in said transverse direction, and means for adding said tracking error signal to said dither oscillation signal so as to provide therefrom said electrical drive signal for said transducer deflecting means and by which said null position of the transducer is aligned with said center of the track.

2. The apparatus according to claim 1; in which said means for synchronously demodulating said detected envelope from said envelope detecting means includes multiplier means having inputs receiving said detected envelope from the envelope detecting means and said deflection signal, respectively.

3. The apparatus according to claim 2; in which said multiplier means is constituted by a balanced modulator.

4. The apparatus according to claim 1; in which said control circuit means further includes first band pass filter means through which said detected envelope from the envelope detecting means is applied to said means for synchronously demodulating the same, and second band pass filter means through which said deflection signal is applied to said means for synchronously demodulating said detected envelope; and each of said first and second band pass filter means has a pass band with a lower cut-off frequency which is a fraction of the frequency of said dither oscillation signal and an upper cut-off frequency which is less than two times said frequency of the dither oscillation signal.

5. The apparatus according to claim 4; in which said control circuit means further includes band elimination filter means through which said tracking error signal is applied to said means for adding the same to said dither oscillation signal, and said band elimination filter means is operative to eliminate a predetermined band of frequencies centered about two times the frequency of said dither oscillation signal.

6. The apparatus according to claim 1; in which said means for synchronously demodulating said detected envelope includes multiplier means having inputs respectively receiving said detected envelope and said deflection signal; and in which said control circuit means further includes band elimination filter means through which said tracking error signal is applied to said means for adding the same to said dither oscillation signal, and said band elimination filter means is operative to eliminate from said tracking error signal a predetermined band of frequencies centered about two times the frequency of said dither oscillation signal.

7. The apparatus according to claim 1; in which said transducer deflecting means includes a support arm carrying said transducer and being deflectable in said transverse direction, and said strain gauge is mounted on said support arm so that said deflection signal generating means generates said deflection signal in response to deflection of said support arm.

8. The apparatus according to claim 7; in which said support arm is constituted by a bi-morph leaf which is cantilevered at one end and has said transducer secured to the other end of said leaf, and said electrical drive signal is applied to said bi-morph leaf for flexing the same and thereby causing the deflection in said transverse direction.

9. The apparatus according to claim 8; in which said bi-morph leaf includes first and second piezo-ceramic elements with outer electrodes on the outer sides thereof, and a control electrode interposed between said first and second ceramic elements, said transducer and said strain gauge are mounted on said outer electrode of the first piezo-ceramic element which is connected to ground, said first and second piezo-ceramic elements are polarized in opposite directions, and voltage dividing means applies electrical drive signal to said piezo-ceramic elements so as to prevent depolarizing thereof.

10. The apparatus according to claim 7; in which said strain gauge is of the resistance wire type to provide a resistance varying with said stressing of the strain gauge, and said circuit means for generating the deflection signal includes a constant current source connected with said strain gauge to provide a voltage signal varying with said resistance, and an amplifier for amplifying said voltage signal.

11. The apparatus according to claim 1; in which said record medium is a magnetic tape having said track extending obliquely thereon and being preceded and followed by similar tracks which are parallel thereto and also have information signals recorded therein, said tape extends helically about at least a portion of the periphery of a guide drum and is adapted to be longitudinally advanced, at least a portion of said guide drum is rotatable, and said transducer is a magnetic head mounted by means of said transducer deflecting means on said rotatable portion of the guide drum so as to rotate with the latter and thereby scan along the one of the tracks positioned in proximity thereto by advancement of the tape.

* * * * *